Oct. 25, 1966   G. S. DOLGORUKOV   3,280,465
DRAFTING INSTRUMENT
Filed Oct. 21, 1965   2 Sheets-Sheet 1
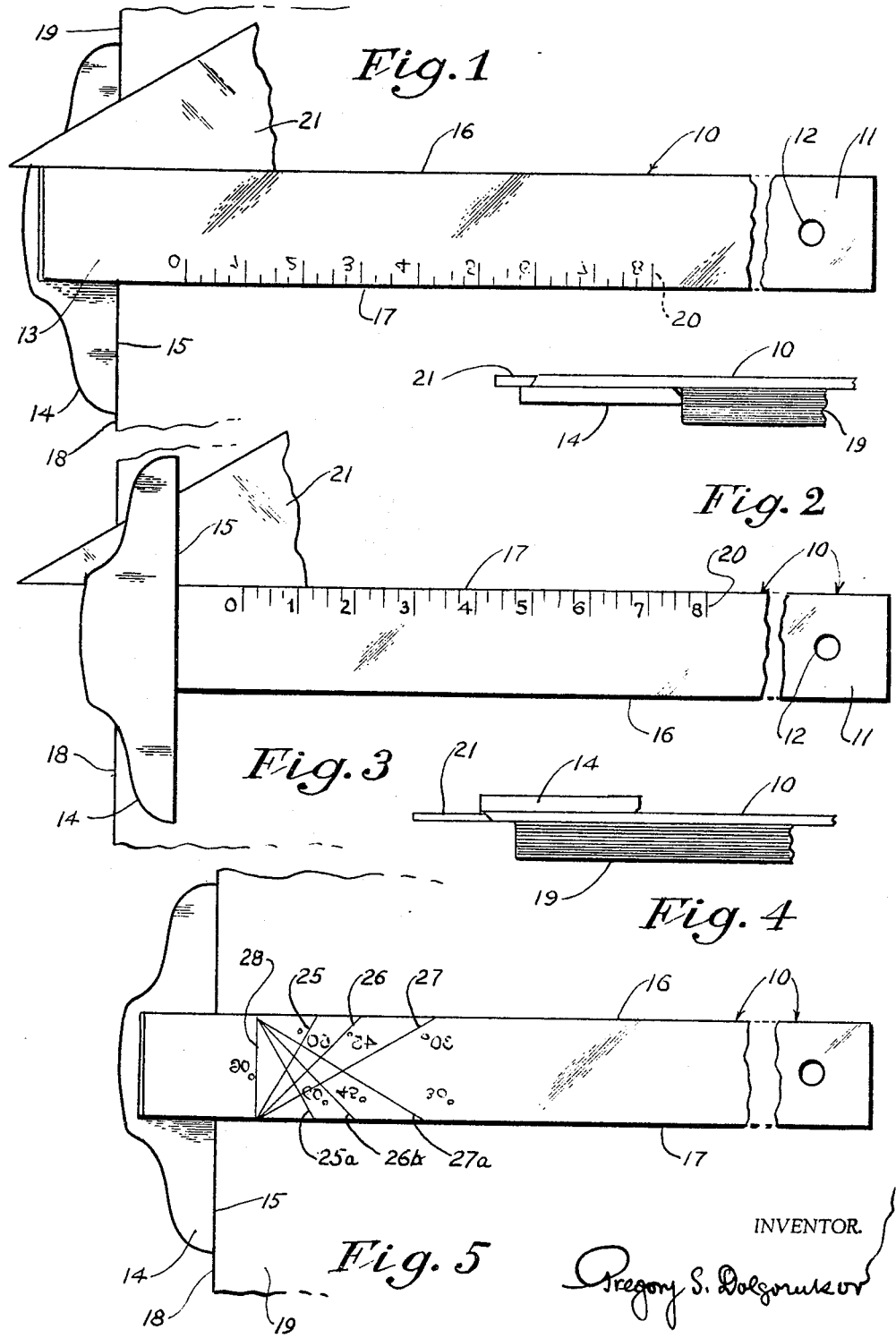
INVENTOR.
Gregory S. Dolgorukov Oct. 25, 1966 G. S. DOLGORUKOV 3,280,465
DRAFTING INSTRUMENT Filed Oct. 21, 1965 2 Sheets-Sheet 2

INVENTOR.
Gregory S. Dolgorukov

United States Patent Office 3,280,465
Patented Oct. 25, 1966

3,280,465
DRAFTING INSTRUMENT
Gregory S. Dolgorukov, Ferndale, Mich.
(407 Fisher Bldg., Detroit, Mich. 48202)
Filed Oct. 21, 1965, Ser. No. 499,160
7 Claims. (Cl. 33—113)

This invention relates to drawing instruments and more particularly to such instrument which performs the function of a conventional ruler having a measuring scale provided thereon, a T-square, a device for drawing lines at 30°, 45°, 60° and 90° to the base line of the drawing as well as to any other line on the drawing.

The present application is a continuation-in-part of my copending application, Serial No. 254, 835, filed January 28, 1963, for Drawing Instrument.

Drafting operations, particularly on small drawing boards or on tablets of padded sheets of paper require for their proper performance, among other instruments, the use of a T-square, at least of two drafting triangles, and of a measuring scale. Use of such instruments, particularly on a small board, often crowds such board and may become very inconvenient.

Accordingly, the need for a practical instrument which could be used both, as a T-square and as a measuring scale, and in some instances as a device serving the functions of a 30°/60°/90° triangle and a 90°/45° triangle has been very keenly felt for years. Because of such a need, a large number of small T-squares with measuring scales printed or molded along their guiding edges have been placed on the market.

The instruments offered heretofore for such purposes are in effect, nothing more than conventional T-square with transparent or non-transparent blades having scales provided along their edges. Such scales are usually provided either along only the top or working edge of the blade or along both the top and the bottom edge of the T-square. The zero line of the scale is usually provided in the plane of the guided edge of the T-square head. Such an instrument may appear to be very simple and practical and large quantities of them are sold. However, an attempt to use an instrument in more than a casual way reveals several very serious drawbacks, inconvenience, and discomfort in their use. After several tries such an instrument is usually laid aside and is used very seldom thereafter.

Applicant came to realization of the fact that while there are available, as separately used and distinct instruments, excellent T-square and excellent measuring scales, combining them together into a single instrument in a manner done heretofore produces an instrument which does not operate properly either as a T-square or as a measuring scale. I have found that this is due to the fact that structural elements of one such instrument interfere with the functional operation of the elements of the other; making both operations inefficient, inconvenient, and severely harmful to the eyesight.

After long experimentation and tests applicant found that with the instrument of the above construction, the same is required to be used as a measuring scale only approximately 7% of the total drafting time. On the other hand, because of the presence of measuring scale on the pencil point guiding edge of the T-square, the user involuntarily concentrates and focuses his eyes on the measuring scale 100% of the drafting time. This produces unnecessary eyestrain, and any prolonged use of such a device causes eye fatigue and headaches, the cause of which may or may not be properly understood by the user of such devices.

On the other hand, when it becomes necessary to lay out a definite distance or to measure the length of the line on the drawing, i.e., to use the devices as a measuring scale, it becomes so cumbersome and inconvenient as to be virtually imperative for such purpose.

In the first place, measurements on the drawings are made *not* from the edge of the drawing board but from points anywhere on the drawing. Yet on such devices the zero line, being in the plane of the guided edge of the head, provides for convenient measuring only from the edge of the drawing board or tablet and not from various points on the surface of the drawing. When an attempt is made to measure from a point on the drawing, such T-square has to be removed from its usual position in which the edge of its head is in contact with the edge of the board and has to be placed on the drawing with both its blade and its *head* on the top of the drawing. In such a position the blade of the T-square where the zero line is provided, is raised above the surface of the drawing for a distance equal to the thickness of the head, which may be as high as ¼″ or even ⅜″, and such raising exists for a distance of several inches, gradually diminishing toward the point on the blade where bending of the blade brings it in contact with the surface of the drawing. Therefore laying off or measuring distances with such devices is like measuring with a scale holding it inclined at a distance from the drawing. This is very annoying and is hardly an efficient or even practicable way to perform measuring operations on a drawing.

It is often attempted to eliminate this difficulty by using the portion of the measuring scale close to the free end of the blade, such as starting measuring from the mark of 10 rather than 0. However, the first movement toward such an operation reveals that the head of the T-square gets off the drawing board, and in the attempts to measure distances particularly along angular lines, the ends of the head hit the drawing board and make such operations most difficult. In other words, presence of the head, which is an indispensable element of a T-square, obviously defeats the purpose of the device in the attempt to use it as a measuring scale. Thus, such a combined T-square and measuring scale which having affected proper functioning of the T-square to the point of being harmful to the user, has not provided a usable measuring scale either.

One of the objects of the present invention is to provide an improved drawing instrument whereby the above difficulties and disadvantages are overcome and largely eliminated without introducing new problems of appreciably increasing the costs involved.

Another object of the invention is to provide an improved instrument for use particularly, but not exclusively, for making small drawings, which instrument being of a unitary construction performs the functions of a free ruler or a straight edge, a measuring scale, a T-square, a 30°/60° triangle, and a 45° triangle, and makes possession of such separate instruments unnecessary, thus eliminating crowding of the drawing board and other serious disadvantages of conventional devices.

A further object of the present invention is to provide a drawing instrument which can be used interchangeable as a T-square, i.e. in cooperation with a guiding edge of a drawing board or a tablet, and as a free ruler or a straight edge, and a measuring scale, all without mutual interference of elements and particularly without interference of the T-square head with the use of the blade as a free straight edge or as a measuring scale, as well as without measuring scale interfering with the use of the instrument as a T-square by causing involuntary focusing of the user's eyes on such scale in the non-measuring drafting operations.

A still further object of the present invention is to provide a drawing instrument which can be used interchangeably as a T-square in cooperation with a guiding edge of a drawing board or a tablet of padded sheets of paper, for drawing parallel lines substantially perpendicular to such guiding edge, as well as a free straight edge with means for setting it at various angles to such lines as well as to any other lines on the drawing, all without interference of structural elements of the T-square with the operation of the straight edge and vice versa.

Further objects and advantages of this invention will be apparent from the following description and appended claims, reference being had to the accompanying drawings forming a part of this specification, wherein like reference characters designate corresponding parts in the several views.

FIG. 1 is a plain view showing a drafting instrument embodying the present invention in an operative position for use as a T-square.

FIG. 2 is an elevational view of the portion of the construction shown in FIG. 1 illustrating the contact of the T-square head with the guiding edge of the drawing board or a trimmed pad of paper.

FIG. 3 is a view similar in part to FIG. 1 but showing the instrument of FIG. 1 turned over and placed with its head on the top of the drawing board and out of contact of the head with the guiding edge of the board for use of the instrument as a measuring scale or as a free straight edge.

FIG. 4 is a fragmentary elevational view of the construction of FIG. 3.

FIG. 5 is a view similar in part to FIG. 1 but illustrating the instrument of a modified construction, capable of use as a T-square, a free straight edge, and as a substitute for 2 drafting triangles, with said device being shown in an operative position for use as a T-square.

Figure 6:
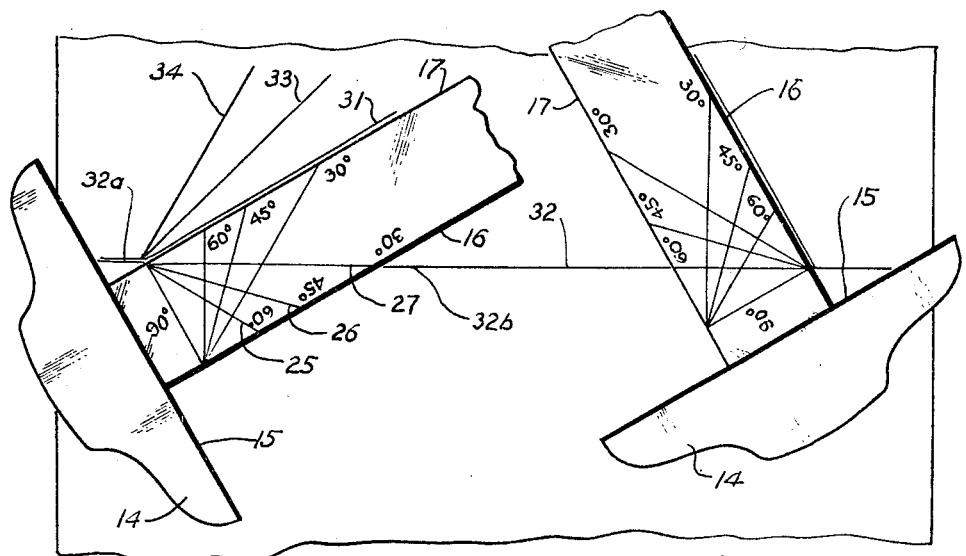
FIG. 6 is a view showing the use of the instrument in FIG. 5 in operative positions for drawing angular lines.

It is to be understood that the invention is not limited in its application to the details of construction and arrangement of parts illustrated in the accompanying drawings, since the invention is capable of other embodiments and of being practiced or carried out in various ways within the scope of the claims. Also, it is to be understood that the phraseology and terminology employed herein is for the purpose of description and not of limitation.

Referring specifically to the drawings, there are shown therein by way of example a number of drafting instruments embodying the present invention. Referring specifically to FIGS. 1–4, the instruments illustrated therein comprises an elongated arm or blade 10 having its free end 11 provided with a hole 12, its other end 13 being secured in any suitable manner to a head 14 having a guided edge 15 adapted to slide along the guiding edge 18 of the drawing board or pad 19. The blade 10 has an upper edge 16 and a lower edge 17, which are finished smooth and are preferably but not necessarily parallel. The blade 10 is made preferably, but not necessarily, from a transparent material, or may be of opaque material with or without transparent edge linings. However in any case the blade is flat at both of its surfaces, i.e., at the top and bottom to lie flat on the surface of the drawing in either of its positions.

In fixing the head 14 to the blade 10, the lower surface of the blade is brought in contact with the upper surface of the head and therefore the blade extends above the top surface of the head as is best illustrated in FIG. 2. The thickness of the blade 10 is preferably equal or slightly greater than that of drafting triangles if any are intended to be used with the instrument illustrated in FIGS. 1–4. By virtue of such a construction a drafting triangle slides over the surface of the head when the instrument is used as a T-square and under the head without interference therefrom when the device is used in the position such as illustrated in FIGS. 3 and 4.

It is an important feature of the invention that in spite of being intended for use both as a T-square and as a measuring scale, the upper edge 16 of the instrument is free from any lines or numerals forming the measuring scale and is entirely clear when the device is used in the position shown in FIG. 1, i.e., as a T-square. I have found that the conventional practice of providing a measuring scale along the top edge of a T-square, or along both the top and the bottom edges of a T-square if two scales are to be provided, is defeating the desired operation of the device and results in eyestrain, fatigue, headaches and in prolonged use may seriously affect user's eyesight. This results from the fact that when such conventional T-square is used in its intended manner, the measuring scale remains within the user's line of vision constantly, causing involuntary focusing of user's eyes thereon in both measuring and non-measuring drafting operations. By extensive time study I discovered that in general drafting in which a conventional device of this nature may be expected to be used, the measuring scale may be used approximately 7% of the drafting time, while the user focuses his eyes on the measuring scale 100% of the time, without realizing the harmful effects thereof.

In my improved construction the measuring scale is provided on the instrument at such a location thereof as to be well out of the line of vision of the draftsman in the use of the working edge of the blade, and in such a manner as to make it impracticable for use when the instrument is used as a T-square. In the embodiment illustrated in FIGS. 1–4 the measuring scale generally designated therein by the numeral 20, is provided only on the lower edge 17 of the instrument. In addition to the construction of the scale and the manner of its provision on the edge are such that its use is impracticable in the position of the instrument shown in FIG. 1. With a transparent blade such scale is provided on the top surface of the blade 10, but upside down and with its numerals, although reading from left to right being provided in reverse. With such an arrangement of the elements of the scale its use in the position of the instrument shown in FIG. 1 is made very difficult and impracticable because of the parallax and eligibility of the numerals. It should also be noted that the zero mark of the scale 20 does not register or coincide with the guided edge 15 of the T-square as in conventional practice but is spaced at a distance therefrom.

Should it become necessary to measure a distance on the drawing surface either in the horizontal or vertical or inclined direction, the instrument is turned over and placed fully on the top of the drawing in a position illustrated in FIGS. 3 and 4. In such a position the measuring scale appears along the edge of the blade 10 which now is the top edge and its numerals appear in a proper position, i.e., upright and read direct rather than being in reverse as in position shown in FIG. 1. Furthermore, the markings forming the lines and the numerals of the scale, printed or embossed, are now on the surface which is in direct contact with the drawing surface, thus eliminating any parallax. In addition, the head 14 of the instrument is disposed at a distance from the surface of the drawing and of the drawing board or pad, making it possible to move the instrument freely over the entire surface of the drawing board or pad and over the guiding edges thereof without the head catching thereon as would be the case should using of the head as a free straight edge or a measuring scale be attempted when the instrument is in its position for use as a T-square wherein its head extends downwardly from the surface of the drawings, such as shown in FIGS. 1 and 2.

Furthermore, should a drafting triangle be used in the position of the instrument shown in FIG. 3, it may be moved freely along the entire edge 17 or 16 without interference from the head since the corner of the triangle 21 can pass under the head 14 as is shown in FIGS. 3 and 4. This cannot be done in the use of conventional constructions mentioned above.

It will be understood that the above disclosed improved construction may also be used in T-squares having non-transparent blades such as inexpensive wooden T-squares used in schools for first exercises in drafting, or metal, particularly aluminum T-squares. In such cases the measuring scale is printed, embossed, or engraved on the bottom surface of the blade along its lower edge and upside down, but direct, i.e., not in reverse. Such a measuring scale will be invisible when the device is used as a T-square, but will appear upright when the T-square is turned over into a position such as shown in FIG. 3. However, there will exist in such a construction a certain degree of parallax because of the distance of the scale from the surface of the drawing. This disadvantage may be reduced or virtually eliminated by beveling of the lower edge from the lower surface of the blade.

The construction illustrated in FIGS. 5 and 6 is intended for use as a T-square, a free straight edge and as a substitute for a 45°/90° triangle and a 30°/60° triangle. The construction of this instrument is substantially similar to that illustrated in FIGS. 1–4, with the difference being primarily in the provision of the angular lines. In this particular construction it is more desirable than in the construction of FIGS. 1–4 that the edges 16 and 17 are parallel although it is not essential. The angular lines 25, 26 and 27 are provided at angles 60°, 45° and 30°, respectively, to the edge 17 while the lines 25a, 26a and 27a are provided at the same angles but pointing in opposite directions also with respect to said edge 17. If the edges 16 and 17 are parallel, the same or connected angular relationship of the angular lines will be effected with respect to both edges 16 and 17. The line 28 is provided at 90° angles to the edges 17 and 16. This line may be eliminated when the instrument is small such as having its blade slightly under 11" for making drawings on a pad of paper with the guided edge 15 of the T-square bearing directly on the trimmed edge of the paper sheets pack. With such a pad having its corners properly trimmed at 90° angles, perpendicular lines can be drawn by moving the head of the T-square to the perpendicular edge of the pad. However, even in such drafting use of line 28 may be desired since it enables setting the blade at 90° angles to any line on the drawing including inclined lines.

In accordance with the invention, the angular lines are provided close to the head of the T-square, but at an appreciable distance therefrom for the reason explained below, on the top surface thereof, with the angular designations embossed thereon in reverse as is shown in FIG. 5.

Such a device is illustrated in FIG. 5 wherein it is shown in a position for use as a T-square with the guided edge 15 of the T-square head 14 being in contact with the guiding edge 18 of the T-square or pad. In such a position angular lines are not practicable for use for the reasons similar to those explained with respect to the measuring scale 20 of the construction of FIG. 1, and therefore no use of the device for such purposes in a position wherein its head interferes with the movements of the T-square for setting the blade at various angles, would be attempted.

The upper edge 16 of the T-square illustrated in FIG. 5 is substantially free from markings with only three angular lines 25, 26 and 27 reaching the actively usable portion of this edge. However, the angular designations are placed sufficiently far from the edge to interfere appreciably with the use of said edge in using the instruments as a T-square.

When it becomes necessary to set the instrument for drawing a line at an angle to any line on the drawing, such as at an angle provided by two conventional drafting triangles, the instrument is turned over to eliminate interference of the head 14. In such a turned-over position the instrument can be moved freely over the surface of the drawing and placed in any position thereon, such as parallel, perpendicular or inclined to any line on the drawing, without the head catching on any of the guiding edges of the drawing board or a pad.

In FIG. 6 the instrument in the left hand portion of the drawing is shown set for drawing along its edge 17 a line such as designated by the numeral 31, said line extending at an angle of 30 degrees with respect to the line 32. In order to set the instrument into the position to provide for drawing the line 31 at 30 degrees to line 32, the instrument is placed over the line 32 in such a manner that its angular line 27 coincides with the line 32, whereupon the line 31 is drawn, as illustrated.

Setting the instrument to have the line 26 extend over and coincide with the line 32 sets the edge 17 for a drawing line 33 at a 45-degree angle to said line 32. Similarly, setting the line 25 over the line 32 sets the edge 17 for drawing a line 34 at a 60-degree thereto. The angles so drawn would point toward the left-hand side of the drawing.

Should it be desired to draw lines at the same angles to said line 32 but pointing toward the right-hand side of the drawing, the instrument is turned counter-clockwise into its position illustrated at the right-hand portion of FIG. 6, and the line 25, 26 or 27 is placed to coincide with the line 32 for drawing the desired angular line along the edge 16. In these operations the angular markings 30°, 45° and 60° along both edges will appear direct and upright, with both the lines and the markings being in direct contact with the drawing surface avoiding parallax. It will be noted that providing angular lines at a distance from the head 15 makes it possible to observe the line on the drawing extend on both sides of the angular line, such as at 32a and 32b with respect to line 27 in FIG. 6, and thus attain better registry.

Figure 7:
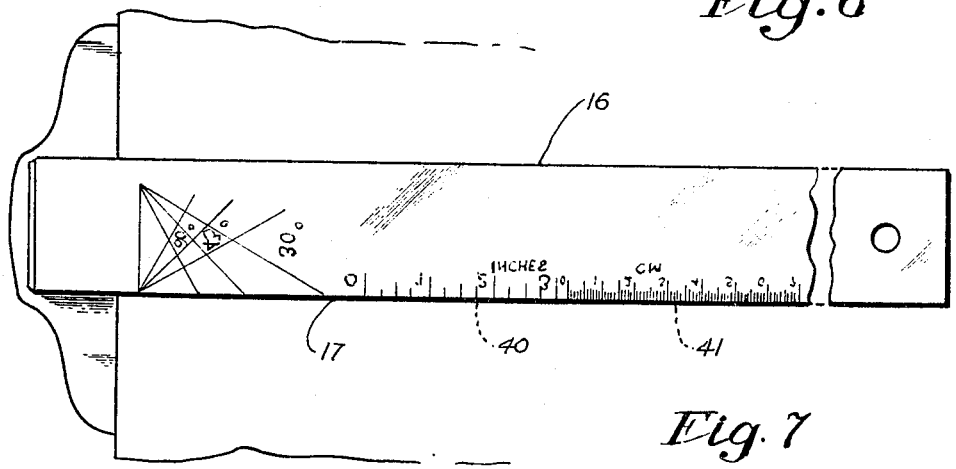
FIG. 7 is a view similar in part to FIG. 5 but showing an instrument capable of being used as a T-quare, as a measuring ruler having two measuring scales, as a substitute for two drafting triangles, and as a free straight edge.

FIG. 7 illustrates an instrument of the above nature which includes both, the angular lines and two measuring scales. Referring to said FIG. 7, it will also be noted that the angular lines thereof provided at the same angles as in the construction of FIGS. 5 and 6 are moved downwardly and are shortened as illustrated, in order to remove the angular line markings away from the upper edge 16 of the instrument and thus leave it free for a substantial width from any markings whatsoever.

In accordance with the invention, when it becomes necessary to provide two distinct scales on the instruments, such as a fractional and decimal inch scales, or inch scale and centimeter scale, neither of such scales is placed along the upper edge of the blade, but both of them are arranged side by side along the lower edge 17.

In the construction of FIG. 7 there is provided an inch scale 40 and a centimeter scale 41. As in the constructions described above and illustrated in FIGS. 1–4, such scales are provided along the lower edge 17 of the blade, on the top surface thereof, upside down, and in reverse, all for the purposes explained above. The angular lines are also provided on the top surface in angular relation with respect to the edge 17. The angular designations are provided along the middle of the blade in a single row, in reverse, to reduce the number of markings to a minimum.

It will be understood that with the edges of the blade such as 16 and 17 being parallel, the angular lines provided to form the desired angles with one of the edges would retain correct angular relationship with the other edge also. On the other hand, should the longitudinal edges of the blade not be parallel, the angular lines are to be provided in proper angular relations to only one of the edges, such as 17, and the angular lines be drawn only along said edge. In the construction of FIG. 7, the blade may be made somewhat wider to accommodate the angular lines of sufficient length.

It will be understood that the instrument of the above disclosed nature is of a particular advantage when it is made for making small drawings such as, for instance, 8½ x 11 inches sin size, and is of a correspondingly small size. Manipulating such instruments such as turning it over, moving its head around the drawing is simple and easy since the instrument is small and light. Using the instrument described above together with a pad of paper of the corresponding size wherein the guiding edge of the T-square is used directly against the edge of the pad, the user can make drawings by holding the pad on his knee and require no drafting triangles or measuring scale. With such instrument the user can make drawings under conditions in the field and in other difficult places, where making drawings was previously considered wholly impracticable. However, it will be understood that the invention can be applicable with success to larger T-square such as 24 inches, although such size would place some limitations on the ease of manipulation of such a large T-square.

By virtue of the above-disclosed constructions, the objects of the present invention listed above and numerous additional avantages are attained.

I claim:

1. A drawing instrument adapted to be used interchangeably as a T-square in cooperation with a guiding edge and as a free measuring scale, and to provide, when used as a T-square, a point-guiding edge free of scale markings and thus to eliminate involuntary eye focusing on such scale markings in non-measuring drafting operations, said instrument being also adapted, when used as a measuring scale, to eliminate interference from the T-square head catching on the guiding edge in moving the instrument over the surface of the drawing as well as eliminating the necessity of tilting and bending the device in such measuring drafting operations; wherein the improved instrument comprises a head having a guided edge, and an elongated transparent blade having one end thereof secured to said head and the other end free, said blade having its bottom surface adapted to lie flat on the surface of the drawing when the head engages the guiding edge and extends downwardly below the surface of the drawing, with the upper surface of the blade being adapted to lie flat on the drawing surface without rocking when the device is turned over and placed on the drawing surface with the head extending entirely above the surface of drawing, said blade having an upper point-guiding edge and a lower edge, and a measuring scale provided only along said lower edge, but not along the upper edge, and in the upside down position, with the numerals of said scale being provided to have the zero mark on the side of the scale adjacent to the guided edge of the head, but at a distance therefrom, with said scale being thus rendered ineffective when the instrument is used as a T-square, but appearing upright along the edge of the blade which became the upper edge when the instrument is turned over for use as a measuring scale.

2. The instrument defined in claim 1, with the blade being transparent and the measuring scale along the lower edge of the blade thereof being provided on the top surface of the blade with the numerals of such scale being provided in the upside down position and inverted, in order to appear upright and direct with the scale reading from the head toward the free end of the blade and to be in direct contact with the drawing surface when the instrument is used as a measuring scale.

3. The instrument defined in claim 1, with a second measuring scale of different divisions provided on said blade also along the lower edge thereof side by side with said first measuring scale in order to relieve said upper edge from the presence of measuring markings.

4. The drawing instrument defined in claim 1, the connection of the head and the blade being such that the blade overlies the top surface of the head and when the instrument is turned over and placed on the drawing with the top surface of the blade in contact therewith, the free portions of the head are spaced from the drawing and thus provide in use for drafting triangles passing under said portions.

5. A drawing instrument adapted to be used interchangeably as a T-square in cooperation with a guiding edge to draw lines perpendicular to said guiding edge and as device for drawing straight lines at predetermined angles to any line on the drawing surface without interference from the T-square head, wherein said improved instrument comprises a head having a guided edge and an elongated transparent blade having one end secured to said head and the other end free, said blade having its bottom surfaces adapted to lie flat on a drawing surface when the head engages the guiding edge, and with the upper surface of the blade being adapted to lie flat on the drawing surface with full contact therewith and without rocking when the instrument is turned over and placed on the drawing with the head extending entirely above the surface of the drawing, said blade having an upper point-guiding edge and a lower point-guiding edge, a plurality of straight lines provided on the top surace of said blade in predetermined angular relation to said edges, and angle-indicating numerals provided at said angular lines, respectively, said numerals being provided on the top surface of the blade and inverted in order to make the use of the device for drawing angular lines practicable only when the instrument is turned over and becomes inoperative as a T-square.

6. The construction defined in claim 5, with said lines being provided adjacent to the head but at an appreciable distance therefrom, and at angles to enable the user to set the instrument for drawing lines at 30°, 45°, and 60° to lines on the drawing.

7. The construction defined in claim 3, with one of said scales being an inch scale, and the other being a centimeter scale, and provided also with lines for setting the instrument for drawing lines at 30°, 45°, and 60° to lines on the drawing, with said lines terminating short of reaching the upper edge of the blade.

No references cited.

LEONARD FORMAN, *Primary Examiner.*